Figure 1:
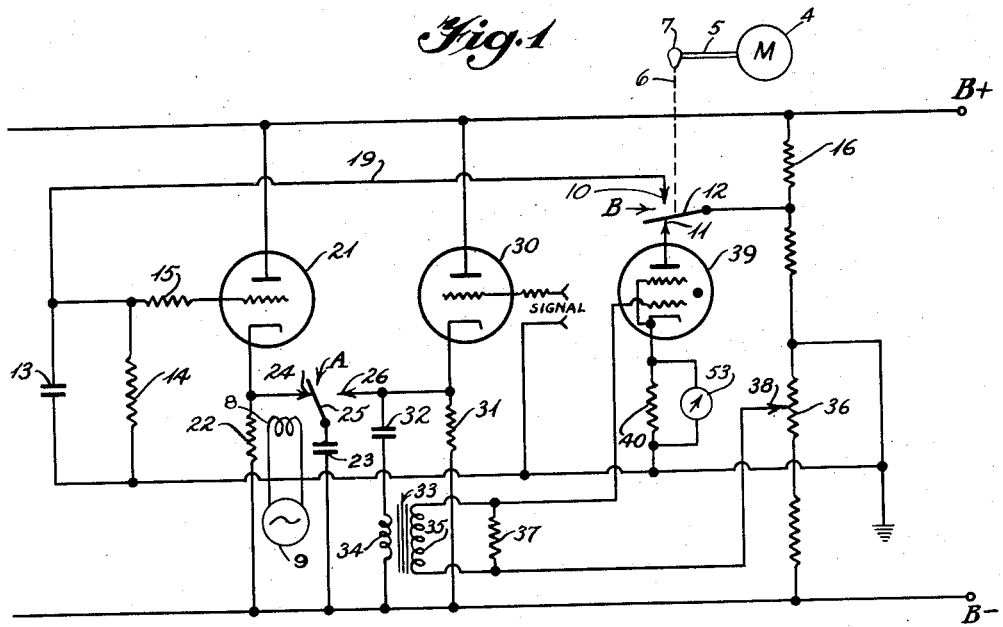

Jan. 20, 1959  J. E. BIGELOW  2,870,409
METER WITH LOGARITHMIC AMPLIFIER
Filed Sept. 15, 1953

INVENTOR
John E. Bigelow
BY
G. J. Schmitt
Walter S. Paul
ATTORNEYS

United States Patent Office 2,870,409
Patented Jan. 20, 1959

2,870,409

METER WITH LOGARITHMIC AMPLIFIER

John E. Bigelow, Altamont, N. Y., assignor, by mesne assignments, to the United States of America as represented by the Secretary of the Navy Application September 15, 1953, Serial No. 380,889

5 Claims. (Cl. 324—132)

The present invention relates to a circuit for producing an output which is proportional to the logarithm of an input.

By utilizing the principle and apparatus of this invention it is possible to indicate the value of an unknown quantity, which may vary exponentially, on a linear quantity meter. Ordinarily it is impractical to measure a quantity which may vary exponentially on a linear meter because of the large range of values of the quantity which is to be measured. However by converting an input value of unknown magnitude which varies exponentially to a value which is proportional to the logarithm of the input value it becomes possible to measure this input with relative facility on a linear meter.

By utilizing the principle and apparatus of this invention it is also possible to derive a quantity which is proportional to the logarithm of a known input voltage. In many applications it is desirable to convert a first given value of known magnitude to a second value which is proportional to the logarithm of the first value. This procedure is of great utility in computer circuits and in other applications where it is necessary to convert a known value to another value which is proportional to the logarithm of the known value.

It is one object of the instant invention to disclose a circuit which is capable of utilizing a linear instrument to accurately measure a signal which may vary exponentially. This is accomplished by obtaining a response from the instant circuit which is proportional to the logarithm of the signal input to be measured. This response can be accurately measured on a linear meter.

It is another object of this invention to disclose a circuit which is capable of utilizing an input of known magnitude to produce an output which is proportional to the logarithm of the input.

It is also an object of this invention to present a circuit which utilizes relatively few components for accomplishing the above mentioned results.

The operation of the instant device depends on the principle that when a charged capacitor discharges across a resistance that the voltage on the capacitor varies exponentially with the length of time of discharge depending on the relative values of the capacitor and resistance. The complete time of discharge of the capacitor is known. A signal voltage is continually compared, by means of a comparing device, with the exponentially decaying voltage of the capacitor which is initially greater than the signal voltage. When the exponentially decaying voltage is greater than the signal input to the circuit, zero output is obtained from the comparing device. When the signal voltage is equal to or less than the value of the exponentially decaying voltage an output of a known maximum value is obtained from the comparing device. These two outputs combine to form a square wave which has a known maximum and minimum value. The duration of the actual square wave is for the time remaining in the discharge cycle of the capacitor after the condition has been reached where the exponentially decaying voltage is equal to the input signal voltage. The average value of the square wave thus formed is proportional to the logarithm of the signal input plus a constant as fully explained in my copending application, Serial No. 380,890 filed of even date. It can thus be seen that from the instant circuit the above mentioned objects of the instant invention may be accomplished.

Figure 2:
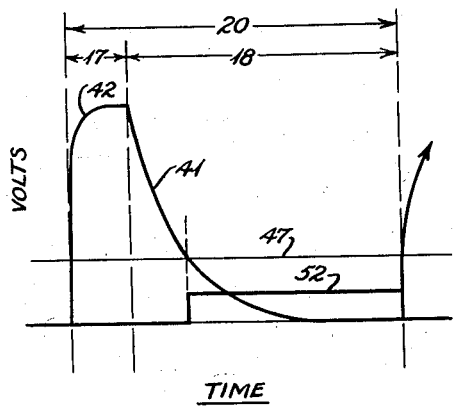
Figure 3:
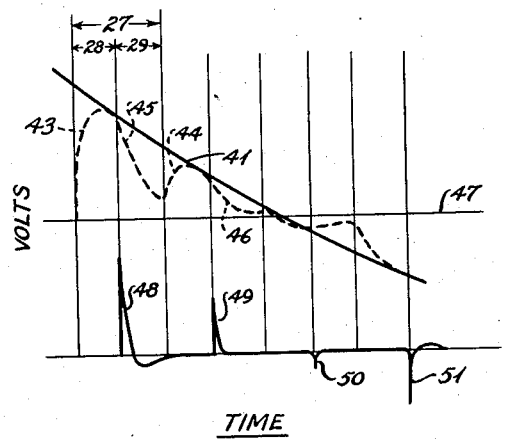

Other objects and many of the attendant advantages will be readily appreciated as the same becomes better understood by reference to the following detailed description when considered in connection with the accompanying drawings wherein:

Fig. 1 is a schematic diagram of the proposed circuit.
Fig. 2 is an explanatory diagram which illustrates the operation of the circuit of Fig. 1.
Fig. 3 is an explanatory diagram which further illustrates the operation of the circuit of Fig. 1 by giving enlarged details of portions of Fig. 2.

Fig. 1 discloses the proposed circuit which makes possible the comparison of a signal voltage and an exponential reference wave by producing a resultant pulse from charged capacitors which changes polarity with change in relative magnitudes. To facilitate the description of the apparatus Figs. 1, 2, and 3 will be discussed together.

Switch B is shown in Fig. 1 as consisting of terminals 10 and 11 and vibrating arm 12. The vibrating forces emanate from motor 4 which drives arm 12 at a low rate through shafts 5, 6 and cam 7. While a motor has been illustrated as the source of vibrations, it is apparent that there are other conventional driving systems that are equally suitable. Arm 12 is connected to a B+ source through resistor 16. Switch B has a complete cycle 20 as shown in Fig. 2. The length of time of contact of arm 12 with contact 10 is depicted as time 17 in Fig. 2. The length of time of contact of arm 12 with contact 11 is depicted as time 18 in Fig. 2. It can thus be seen that capacitor 13 which is connected to contact 10 by means of line 19 is charged according to curve 42 during time 17 because arm 12 of switch B is in contact with terminal 10 for this length of time. After time 17 expires arm 12 loses contact with terminal 10 and makes contact with terminal 11. Thereupon capacitor 13 discharges across resistor 14. The voltage across resistor 14 decreases as capacitor 13 continues to discharge. Discharge of capacitor 13 occurs for the time 18 (Fig. 2). The discharge curve for capacitor 13 is shown as curve 41 in Fig. 2. This decrease of voltage across resistance 14 is reflected as a decrease in voltage on the grid of tube 21. The cathode of tube 21 is connected to a B− source through resistor 22 and the plate of tube 21 is connected to a source of B+. It can be readily seen that the voltage drop across resistor 22 will vary directly with the voltage on the grid of tube 21. Therefore since the voltage on the grid of tube 21 drops as capacitor 13 discharges, the voltage across resistor 22 will also drop.

Resistor 22 is periodically connected across capacitor 23 by means of vibrator switch A which consists of terminals 24 and 26 and vibrating arm 25. The driving force for arm 25 is provided by coil 8 which is energized by a relatively high frequency source 9. The total cycle of switch A is depicted by time 27 in Fig. 3. Time 28 represents the length of time which arm 25 spends in contact with terminal 24 and time 29 represents the length of time which arm 25 spends in contact with terminal 26. It is to be noted at this point that the cycle 27 of switch A is extremely small when compared to the cycle 20 of switch B, the ratio of the two cycles being of the order of 1:100. Fig. 3 is exaggerated for purposes of explaining the mode of operation of the circuit. When arm 25 is in contact with terminal 24, the voltage across capacitor 23 is the same as the voltage across resistor 22.

An input signal, of known or unknown magnitude, is impressed on the grid of tube 30. The plate of tube 30 is connected to a source of B+ and the cathode is connected to a source of B− through resistor 31. It can readily be seen that any changes in the magnitude of the received signal will cause a corresponding change of voltage across resistor 31. Capacitor 32 is connected across resistance 31. Therefore the voltage across the capacitor 32 will be approximately equal to the voltage across resistance 31. Connected in series with capacitor 32 is winding 34 of transformer 33.

It will be noted that arm 25 of switch A is in contact with terminal 26 for the time 29 of cycle 27. Under these conditions capacitors 23 and 32 are connected across each other. It will be noted that when this situation occurs, if the charges on capacitors 23 and 32 are unequal that a pulse will be produced through primary winding 34 of transformer 33. The polarity of the pulse depends on the relative magnitude of the charges on capacitors 23 and 32 as explained more fully hereafter.

The control grid of thyratron 39 is biased by manipulating movable tap 38 along resistor 36. Tap 38 is connected to one end of winding 35. The other end of winding 35 is attached to the control grid of thyratron 39. Resistance 37 is connected across winding 35. Thus the position of tap 38 determines the bias on the control grid of thyratron 39. The cathode of thyratron 39 is connected to ground across resistance 40. The plate of thyratron 39 is connected to terminal 11 of switch B. Terminal 11 is in turn connected through arm 12 by way of resistance 16 to B+. It can be seen therefore, that thyratron 39 can fire for no longer a time than that time during which its plate is connected to B+ through switch B. Thyratron 39 fires when the induced voltage in winding 35 is of sufficient magnitude and proper polarity to impress a positive voltage on the control grid of thyratron 39. It will be noted that once thyratron 39 is energized that it continues to discharge until such time that arm 12 breaks contact with contact 11.

When thyratron 39 is energized there is a voltage impressed across resistance 40. The magnitude and duration of this voltage is depicted by numeral 52 in Fig. 2. This voltage along with the zero voltage which is obtained when the exponentially decaying voltage is greater than the signal voltage produces square wave 52.

In operation capacitor 13 charges according to curve 42 (Fig. 2) while switch arm 12 is in contact with contact 10. When arm 12 loses contact with contact 10 capacitor 13 decays exponentially across resistance 14 according to curve 41 (Figs. 2 and 3). While capacitor 13 is discharging vibrator A operates according to cycle 27 (Fig. 3). Capacitor 23 charges during time 28 while vibrator arm 25 is in contact with contact 24. Capacitor 23 charges according to curves 43 and 44. Capacitor 23 discharges according to curves 45 and 46 when arm 25 is in contact with contact 26. The signal voltage magnitude is depicted by line 47 in Figs. 2 and 3.

It is to be noted that the charge on capacitor 23 approaches the charge 41 on capacitor 13 when arm 25 is in contact with terminal 24 and tends to approach the charge on capacitor 32 when arm 25 is in contact with terminal 26.

The difference in magnitude between the charges on capacitors 23 and 32, when the charge on capacitor 23 is greater than the charge on capacitor 32, is shown by pulses 48 and 49 in Fig. 3. These pulses 48 and 49 are those which travel through the primary winding 34 of the transformer 33. These pulses are of the opposite polarity of that which is required to cause the control grid of tube 39 to go positive. However, when the charge on capacitor 32 is greater than the charge on capacitor 23 pulses 50 and 51 are produced. These charges, which are in the winding 34, are of the proper polarity to induce a voltage in the secondary winding 35 and therefore cause the control grid of tube 39 to go sufficiently positive in order to fire the thyratron 39. The magnitude of the pulse, such as pulse 50, which is required to fire the thyratron can be adjusted by biasing the control grid of thyratron 39 by adjusting slidable tap 38 on resistance 36.

It is to be noted, by reference to Fig. 2, that thyratron 39 fires at approximately the point of intersection of decay curve 41 and the signal voltage line 47. It is to be further noted that the output from the circuit, as taken across cathode resistance 40, is depicted on Fig. 2 as square wave 52. If the circuit is used for measuring an unknown quantity wave 52 can be utilized to energize a properly calibrated D. C. meter 53. Since the average value of the square wave 52 is proportional to the logarithm of the input voltage 47 plus a constant as fully explained in my copending application Serial No. 380,890, filed of even date, this average value can be utilized to give an indication of the magnitude of the unknown voltage on the properly calibrated D. C. meter 53. If the circuit is used for obtaining a value which is proportional to the logarithm of a known input, it can be readily seen that the average value of square wave 52 supplies this requirement.

It is to be further noted that secondary 35 of transformer 33 has many more turns than primary winding 34. Thus it can be seen that even though the voltage difference between capacitors 23 and 32 may be small the pulse which is formed by this small difference is magnified because of the high secondary-primary ratio of the transformer. This feature adds to the sensitivity of the circuit.

It is to be further observed that tubes 21 and 30 are presented in a cathode follower arrangement to supply voltage to contacts 24 and 26 of switch A. This is a practical necessity since capacitor 23 must be charged rapidly without drawing appreciable current from the parallel R–C circuit which forms exponential reference 41. In order to balance tube voltages and to recharge capacitor 32 rapidly cathode follower 31 is used.

Obviously many modifications and variations of the present invention are possible in the light of the above teachings. It is therefore to be understood that within the scope of the appended claims the invention may be practiced otherwise than as specifically described.

Having thus described my invention I claim:

1. A circuit for producing a response which is proportional to the logarithm of a signal of unknown magnitude, comprising: means for producing a periodic exponentially decaying signal, first charge storage means having a charge and discharge circuit for producing thereon a charge which is a function of the unknown magnitude, second charge storage means intermittently coupled to said periodic exponentially decaying signal producing means and to said first charge storage means for comparing the exponentially decaying signal and the voltage produced by the first charge storage means, and means connected to said charge and discharge circuit and responsive to the discharge of said first charge storage means for producing a response the value of which is proportional to the time that the decaying signal is a lesser magnitude than the voltage produced by said first charge storage means.

2. A circuit for producing a response which is proportional to the logarithm of a signal of unknown magnitude whereby the magnitude of the unknown signal may be measured, comprising: means having a charge and discharge circuit for producing and storing a first charge which is proportional to the signal of unknown magnitude, means for producing a second charge of known value which decays exponentially, charge storing means alternately coupled to said first charge producing means and to said second charge producing means for periodically comparing the first and second charges, signal producing means responsive to the discharge of said first charge storing means for producing an output signal of constant value, and indicator means for averaging the output signals whereby an indication is obtained which is proportional to the logarithm of the unknown signal.

3. A circuit for producing a response which is proportional to the logarithm of an input signal, comprising: a first switch connected to a voltage supply and having first and second terminals, the voltage supply being connected to the first terminal for one position of the switch and to the second terminal for another position of said switch, first charge storage means for storing a charge connected to said first terminal, means for allowing said charge to exponentially decay when said voltage supply is connected to said second terminal, second charge storing means for producing and storing a charge which is proportional to the value of the input signal, third charge storage means, means for producing a voltage proportional to said exponentially decaying charge, second switch means for alternately connecting said third charge storage means to said voltage producing means and said second charge storage means, said second charge storage means discharging when the charge thereon is greater than the charge on said third charge storage means, constant amplitude pulse producing means connected to said second terminal of said first switch and responsive to the discharge of said second charge storage means for producing a constant amplitude pulse, means for periodically operating said first switch at a first rate and means for periodically operating said second switch at a second rate which is much higher than said first rate, whereby the average value of said constant amplitude pulses is proportional to the logarithm of the input signal.

4. A circuit as set forth in claim 3 with indicator means connected to said constant amplitude pulse producing means for averaging the value of the pulses whereby an indication is obtained which is the logarithm of the input signal.

5. A circuit for producing a response which is proportional to the logarithm of an input signal comprising first means for producing an exponentially decaying voltage; a first cathode follower circuit having a tube with a grid connected to said first means and a cathode with an output terminal; a second cathode follower circuit having a tube with a grid to which the input signal is applied, a cathode with an output terminal, and a cathode resistor shunted by first charge storage means; second charge storage means; periodically operated first switch means for alternately connecting said second storage means to said cathode output terminals, square wave producing means responsive to a discharge current of said first storage means for producing a square wave, second periodically operated switch means for alternately connecting a source of energy to said first means and said square wave producing means, said second switch operating at a much slower rate than said first switch, and square wave averaging means connected to said square wave producing means for obtaining an average value of said square waves which average value is proportional to the logarithm of the input signal.

References Cited in the file of this patent
UNITED STATES PATENTS

| | | |
|---|---|---|
| 2,228,883 | Morgan | Jan. 14, 1941 |
| 2,662,213 | Vanderlyn | Dec. 8, 1953 |